W. S. THOMPSON.
TRAP NEST.
APPLICATION FILED MAR. 8, 1916.
1,187,793.
Patented June 20, 1916.
2 SHEETS—SHEET 1.
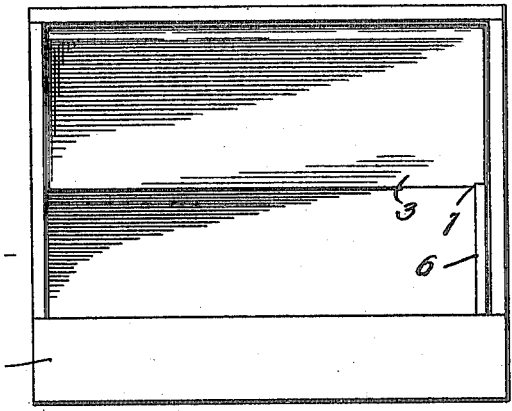
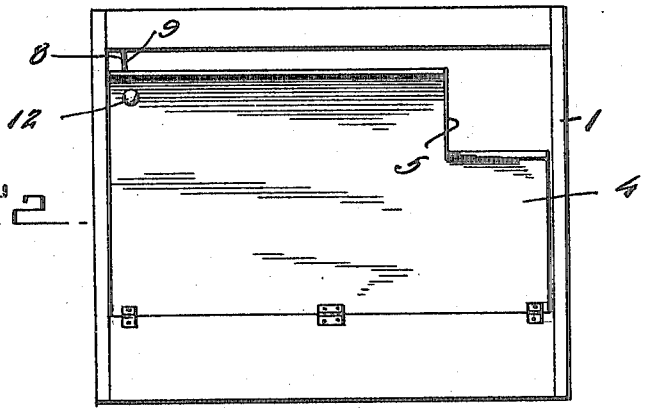
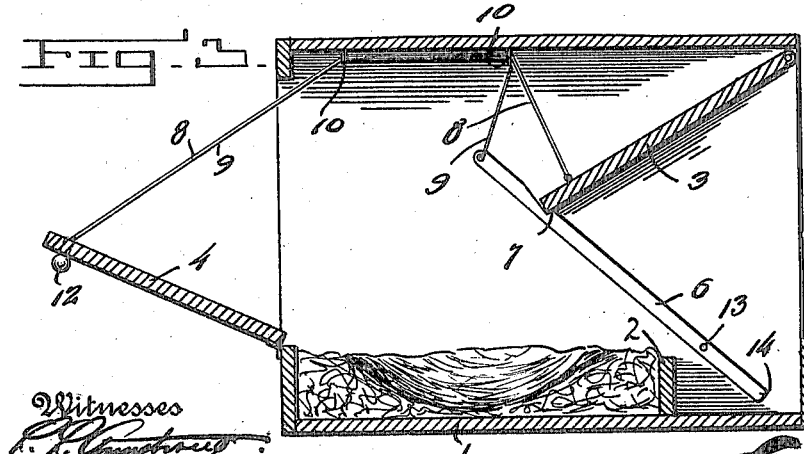

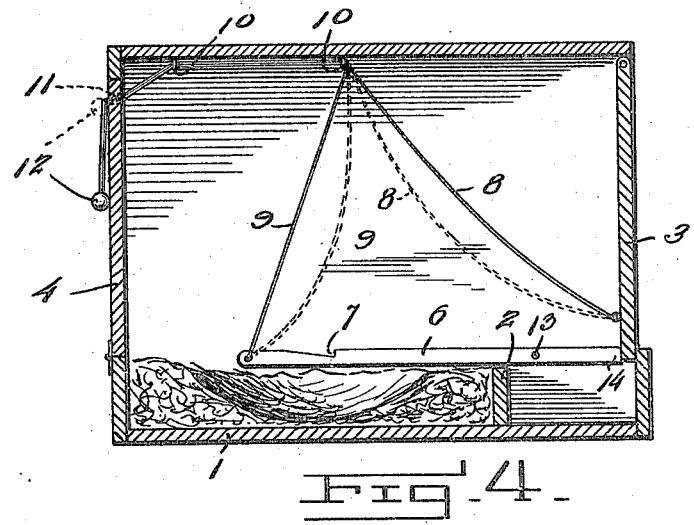
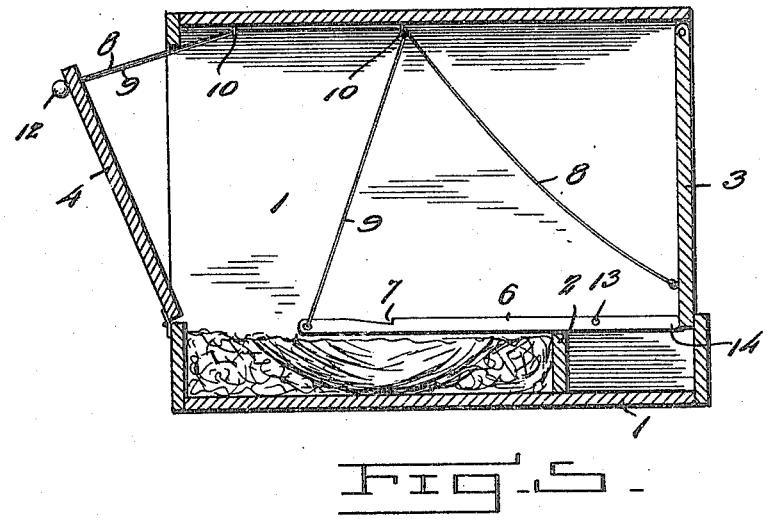

UNITED STATES PATENT OFFICE.

WINFIELD S. THOMPSON, OF LEWES, DELAWARE.

TRAP-NEST.

1,187,793.  Specification of Letters Patent.  Patented June 20, 1916.

Application filed March 8, 1916. Serial No. 82,856.

*To all whom it may concern:*

Be it known that I, WINFIELD SCOTT THOMPSON, a citizen of the United States, residing at Lewes, in the county of Sussex and State of Delaware, have invented a new and useful Trap-Nest, of which the following is a specification.

My invention relates to an improvement in trap nests, and my object is to provide a construction having a simple, efficient and novel trap mechanism and having novel means for disclosing to the poultryman at a distance whether the nest is occupied and for enabling the poultry to signal the poultryman when an egg has been laid and release from the nest is sought.

It is further my object to provide a novel combination and arrangement of parts, as more fully hereinafter set forth.

I attain the objects of my invention by the mechanism illustrated in the accompanying drawings, in which—

Figure 1 is a view of the trap end of the nest; Fig. 2 is a view of the nest from the end from which the poultry is taken from the nest, the front door being shown partially open; Fig. 3 is a longitudinal section of the nest with the trap in raised position; Fig. 4 is a similar view but with the trap door sprung; and Fig. 5 is a similar view but with the front or signaling door in partially open position.

Similar characters of reference designate like parts throughout the several views.

Referring to the accompanying drawings, I provide a nest box 1, having a suitable upstanding transverse partition 2 spaced apart from the opening to the nest. A suitable trap door 3 is provided, and at the opposite end of the nest box a signaling door 4 is provided, as illustrated, this door having a cut out portion 5 to form a light opening and also for the purpose of making the door substantially lighter in weight than trap door 3, to which it is operatively connected by cord 8. Signaling door 4 is also operatively connected by cord 9 with a suitable pivoted bar or trigger 6, having a notched portion 7 adapted to engage trap door 3 to hold it in open or set position, as illustrated in Fig. 3. Cords 8 and 9 are threaded through suitable eyes 10 attached to the roof of the nest box 1, as illustrated in Figs. 3–5; and cords 8 and 9 extend through a suitable orifice 11 in the upper portion of signaling door 4, as indicated in Fig. 4, and have a suitable fastening member or ball 12 attached to their ends, as illustrated in Fig. 4, the cords being substantially of the length illustrated in the drawings, to permit of door 4 being moved by the poultry to signaling position when the poultry desires to be removed from the nest. Trigger 6 is attached to nest box 1 by a suitable pivot 13. The locking end 14 of trigger 6 engages the bottom portion of trap door 3 to hold same in closed position when the trap has been sprung, as illustrated in Figs. 4 and 5.

In the operation of the nest, trap door 3 is secured in raised or set position by the engagement of its bottom portion in notch 7 of trigger 6, as illustrated in Fig. 3, door 4 being held also in open position, by its operative connection with door 3 by means of cord 8. As the hen enters the nest, it must climb over upstanding partition member 2, thus causing it to brush against the bottom of trap door 7, raising and releasing the door 3 from its engagement with notched portion 7 of trigger 6. Thus released, trap door 3 swings by gravity to closed position, also causing door 4 to close as illustrated in Fig. 4, end 14 of trigger 6, which drops by gravity to a horizontal position also engaging against the bottom portion of trap door 3, as illustrated in Figs. 4 and 5 to lock same in closed position. When the hen has laid the egg, the light admitted through cut out portion 5 of door 4 will cause her to make attempts to depart from that end of the nest box, thus causing the door 4 to swing partially open, as illustrated in Fig. 5, to the extent permitted by slack in cords 8 and 9. In this position the door serves as a signal to the poultryman, notifying him from a distance that the hen is ready to be released, and saving him much labor and time which would be required in inspecting nest boxes if he were without means of ascertaining when the poultry desired to be released. The hen is released through door 4, which is moved to the position shown in Fig. 3, thus resetting the trap mechanism, the cords 8 and 9 being of such relative lengths as to cause trigger 6 and trap door 3 to engage in correct raised position as illustrated when door 4 is moved to its position for removal of the hen as shown in Fig. 3. Cord 9 is of suitable length relative to cord 8 to cause the disengagement of end 14 from trap door 3 when door 4 is opened by the poultryman for the release of the hen, as will be understood by reference to the accompanying drawings.

What I claim is:

1. A trap nest having a plurality of doors, one of the doors being a trap door and overbalancing the other door, a pivoted trigger having means for holding the trap door in set or open position, said trigger being disposed so that one end will engage against the trap door to lock same in closed position when the trap is sprung, an upstanding partition positioned relative to the trap door at such distance as to cause the poultry to brush against the trap door and spring same on entering the nest, and means operatively connecting the trigger and trap door with the lighter nest door.

2. A trap nest having opposite doors, a trigger, said trigger being arranged to hold the trap door in raised position until sprung by entrance of a hen and to lock the trap door in closed position as soon as it is sprung, cords operatively connecting the trap door and trigger member with a signaling door, the signaling door having a cut out portion to form a light opening, cords operatively connecting the signaling door with the trigger and with the trap door, said cords being of such length as to permit of the hen pushing the closed signaling door to partially open or signaling position when she desires to be released, substantially as set forth.

WINFIELD S. THOMPSON.

Witnesses:
NAPOLEON B. REGISTER,
FRANK E. JOHNSON.

Copies of this patent may be obtained for five cents each, by addressing the "Commissioner of Patents, Washington, D. C."